(12) United States Patent
Hayashi

(10) Patent No.: US 9,845,101 B2
(45) Date of Patent: Dec. 19, 2017

(54) PUSHCART

(71) Applicant: Murata Manufacturing Co., Ltd., Kyoto (JP)

(72) Inventor: Takanori Hayashi, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 15/443,086

(22) Filed: Feb. 27, 2017

(65) Prior Publication Data
US 2017/0166231 A1    Jun. 15, 2017

Related U.S. Application Data

(63) Continuation of application No. PCT/JP2015/074585, filed on Aug. 31, 2015.

(30) Foreign Application Priority Data

Sep. 3, 2014  (JP) ................................. 2014-178730

(51) Int. Cl.
*B62B 5/00* (2006.01)
*B62B 5/04* (2006.01)
(Continued)

(52) U.S. Cl.
CPC ............ *B62B 5/0069* (2013.01); *B60L 15/20* (2013.01); *B60L 15/2009* (2013.01); *B62B 3/00* (2013.01);
(Continued)

(58) Field of Classification Search
CPC  B62B 5/04; B62B 3/00; B62B 5/0069; B62B 5/0043; B60L 15/20;
(Continued)

(56) References Cited

U.S. PATENT DOCUMENTS 3,834,481 A * 9/1974 Carlson ................. B60T 8/1708
   172/7
3,913,680 A * 10/1975 Carlson ............. A01B 63/1145
   172/2

(Continued)

FOREIGN PATENT DOCUMENTS

JP    H09130921 A    5/1997
JP    2003143718 A    5/2003

(Continued)

OTHER PUBLICATIONS

International Search Report for PCT/JP2015/074585 dated Nov. 17, 2015.
Written Opinion for PCT/JP2015/074585 dated Nov. 17, 2015.

*Primary Examiner* — Russell Frejd
(74) *Attorney, Agent, or Firm* — Pearne & Gordon LLP

(57) ABSTRACT

A pushcart includes a left wheel, a right wheel, a left wheel driver, a right wheel driver, a control unit, a left wheel rotary encoder, and a right wheel rotary encoder. The left wheel driver rotates the left wheel. The right wheel driver rotates the right wheel. The left wheel rotary encoder detects a rotational angle of the left wheel. The right wheel rotary encoder detects a rotational angle of the right wheel. The pushcart performs feedback control on angular velocities of the left wheel and the right wheel at least using an integral operation. The control unit calculates a weighted average of an integral element with respect to the angular velocity of the left wheel and an integral element with respect to the angular velocity of the right wheel, and then separately controls the left wheel driver and the right wheel driver based on the weighted average.

7 Claims, 11 Drawing Sheets

(51) Int. Cl.
  *B62B 3/00* (2006.01)
  *B60L 15/20* (2006.01)
  *G05D 3/12* (2006.01)
  *B62D 51/00* (2006.01)
  *B62D 51/04* (2006.01)

(52) U.S. Cl.
  CPC .............. *B62B 5/0043* (2013.01); *B62B 5/04* (2013.01); *B62D 51/001* (2013.01); *B62D 51/04* (2013.01); *G05D 3/12* (2013.01); *B60L 2240/26* (2013.01); *B60L 2240/42* (2013.01); *Y02T 10/7275* (2013.01)

(58) Field of Classification Search
  CPC ............. B60L 15/2009; B60L 2240/42; B60L 2240/26; G05D 3/12; B62D 51/001; B62D 51/04; Y02T 10/7275
  See application file for complete search history.

(56) References Cited

U.S. PATENT DOCUMENTS

| | | | | |
|---|---|---|---|---|
| 6,024,187 | A * | 2/2000 | Takeda | G01C 21/28 180/408 |
| 9,089,460 | B2 * | 7/2015 | Shirato | A61H 3/04 |
| 9,474,678 | B2 * | 10/2016 | Hane | A61H 3/04 |
| 2003/0079924 | A1 | 5/2003 | Wakitani et al. | |
| 2003/0111973 | A1 | 6/2003 | Iwashita et al. | |
| 2008/0039990 | A1 * | 2/2008 | Stevens | G05D 1/0891 701/22 |
| 2009/0217478 | A1 * | 9/2009 | Chong | A47L 5/36 15/319 |
| 2011/0010013 | A1 * | 1/2011 | Ruan | B25J 5/007 700/261 |
| 2011/0238247 | A1 * | 9/2011 | Yen | B62H 1/12 701/22 |
| 2014/0251708 | A1 * | 9/2014 | Yeh | B62K 1/00 180/206.3 |
| 2015/0096820 | A1 * | 4/2015 | Strack | B62K 11/007 180/181 |
| 2015/0183463 | A1 * | 7/2015 | Shirato | A61H 3/04 701/41 |
| 2016/0176429 | A1 * | 6/2016 | Shirato | A61H 3/04 701/22 |
| 2016/0193103 | A1 * | 7/2016 | Hane | A61H 3/04 701/48 |
| 2016/0221594 | A1 * | 8/2016 | Kubo | B62B 5/068 |
| 2016/0368541 | A9 * | 12/2016 | Strack | B62K 11/007 |

FOREIGN PATENT DOCUMENTS

| | | |
|---|---|---|
| JP | 2003189657 A | 7/2003 |
| JP | 2005094898 A | 4/2005 |

* cited by examiner

PUSHCART

This is a continuation of International Application No. PCT/JP2015/074585 filed on Aug. 31, 2015 which claims priority from Japanese Patent Application No. 2014-178730 filed on Sep. 3, 2014. The contents of these applications are incorporated herein by reference in their entireties.

BACKGROUND

Technical Field

The present disclosure relates to pushcarts that have right and left wheels, and particularly relates to pushcarts configured to control and drive the wheels.

Two-wheel riding vehicles configured to drive and control the wheels have been known (for example, see Patent Document 1). A two-wheel riding vehicle disclosed in Patent Document 1 includes a base, a boarding platform supported on the base with a spring, a motor provided on the base, and right and left wheels driven by the motor. This two-wheel riding vehicle further includes a rate gyroscope, a base tilt sensor, a boarding platform tilt sensor, a motor rotation angle sensor, and a control unit.

The control unit performs self-control using a wheel-type inverted pendulum stabilization control method based on signals of the rate gyroscope, the base tilt sensor, and the motor rotation angle sensor. In addition, the control unit detects weight movement of a user in a front-rear direction with the signal of the base tilt sensor so as to perform forward-backward movement control, and detects the weight movement of the user in a right-left direction with the signals of the boarding platform tilt sensor and the base tilt sensor so as to perform travelling direction control.

Patent Document 1: Japanese Unexamined Patent Application Publication No. 2005-94898

BRIEF SUMMARY

With the two-wheel riding vehicle of Patent Document 1, in the case where only one of the two wheels falls into a groove and thereafter comes out of the groove, forces largely different from each other are temporarily exerted on the right and left wheels. In the case where motors for separately driving the right and left wheels are controlled by a general PI control operation, even if one of the wheels comes out of the groove into which the stated wheel has fallen and the loads exerted on the right and left wheels have come to be approximately equal to each other, output of each integral operation with respect to the right and left wheels remains largely different from each other. This raises a risk that a user cannot make the two-wheel riding vehicle travel in a straight line temporarily.

The present disclosure provides a pushcart that a user can make travel in a straight line as intended even if the loads exerted on the right and left wheels temporarily become largely different from each other.

A pushcart according to the present disclosure includes a main body, a first wheel, a second wheel, a first wheel driver, a second wheel driver, a control unit, and a wheel angular velocity detector. The first wheel is provided at the left side of the main body in a travelling direction. The second wheel is provided at the right side of the main body in the travelling direction. The first wheel driver rotates the first wheel about a rotational shaft of the first wheel. The second wheel driver rotates the second wheel about a rotational shaft of the second wheel. The wheel angular velocity detector detects an angular velocity of each of the first wheel and the second wheel about the rotational shafts thereof. The pushcart of the disclosure performs feedback control, at least using an integral operation, on the angular velocities of the first wheel and the second wheel about the rotational shafts thereof. The control unit calculates a weighted average of an integral element with respect to the angular velocity of the first wheel about the rotational shaft thereof and an integral element with respect to the angular velocity of the second wheel about the rotational shaft thereof, and then separately controls the first wheel driver and the second wheel driver based on the weighted average.

With this configuration, by adjusting the weights in the calculation of the weighted average, output of the integral operation with respect to the first wheel and output of the integral operation with respect to the second wheel can be appropriately averaged. This makes it possible to make the pushcart travel in a straight line as intended by the user even if loads exerted on the first and second wheels are significantly different from each other temporarily.

In the pushcart according to the disclosure, the control unit may make the weighted average approach an arithmetic average as a difference between an angular velocity command value of the first wheel and an angular velocity command value of the second wheel becomes smaller. With this configuration, in the case where a user attempts to make the pushcart travel straight in the travelling direction, the output of the integral operation with respect to the first wheel and the output of the integral operation with respect to the second wheel become equal to each other. Because of this, even if the loads exerted on the first wheel and the second wheel are significantly different from each other temporarily, the user can make the pushcart travel in a straight line. Further, in the case where the user attempts to turn the pushcart (attempts to revolve in a yaw direction), the respective integral operations with respect to the first wheel and second wheel become independent of each other. This makes it possible for the user to turn the pushcart as intended.

The pushcart according to the disclosure may be configured as follows. That is, the pushcart of the disclosure includes a braking operation reception portion that receives a braking operation with respect to the first wheel and the second wheel. The control unit makes the weighted average approach the arithmetic average as an operation amount of the braking operation becomes larger. With this configuration, in the case where the user attempts to stop the pushcart, the output of the integral operation with respect to the first wheel and the output of the integral operation with respect to the second wheel become equal to each other. Because of this, even if the output of the integral operation with respect to the first wheel and the output of the integral operation with respect to the second wheel are largely different from each other before the braking operation, the user can stop the pushcart without necessarily turning the pushcart in the yaw direction.

According to the present disclosure, even if the loads exerted on the right and left wheels become largely different from each other temporarily, the user can make the pushcart travel in a straight line as intended.

DETAILED DESCRIPTION

First Embodiment

Figure 1:
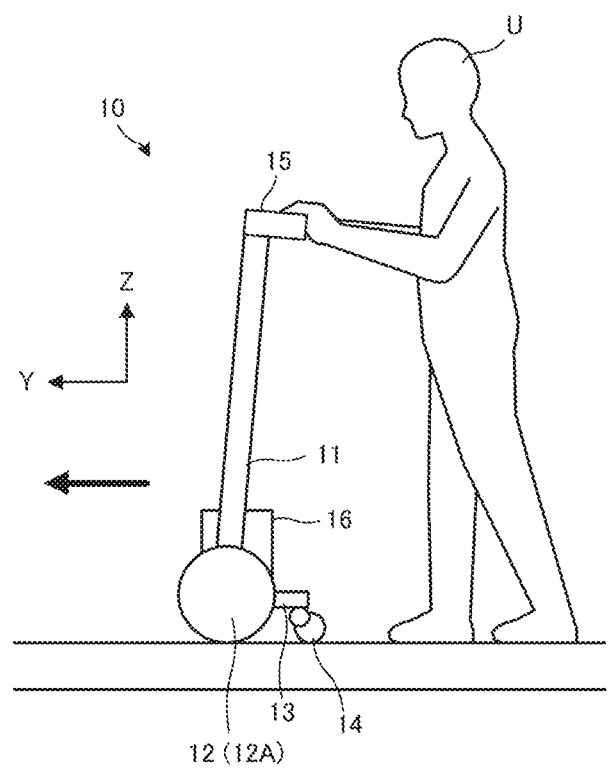
FIG. 1 is a left side view of a pushcart according to a first embodiment.
Figure 2A:
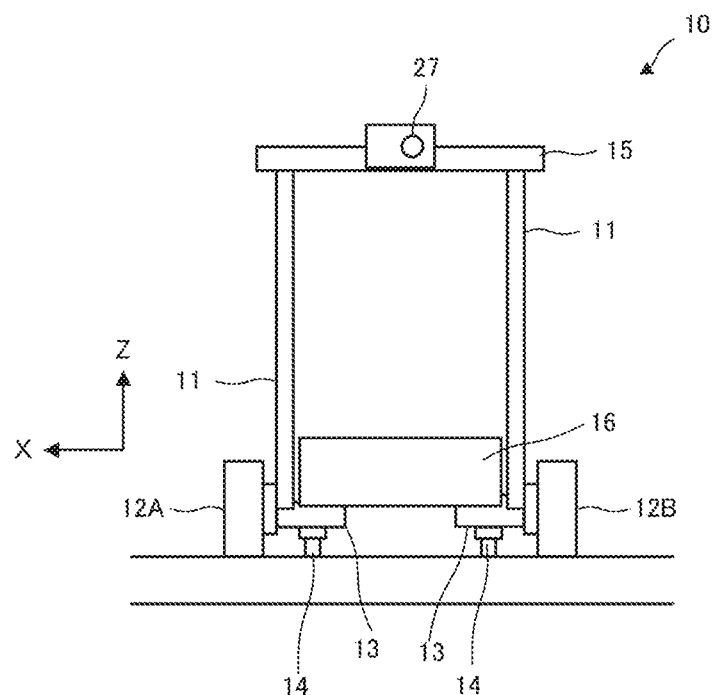
FIG. 2A is a front view of the pushcart according to the first embodiment.
Figure 2B:
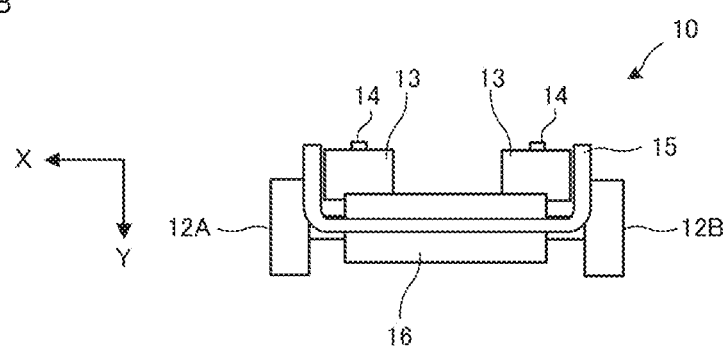
FIG. 2B is a plan view of the pushcart according to the first embodiment.

A pushcart 10 according to a first embodiment of the present disclosure will be described. FIG. 1 is a left side view of the pushcart 10, FIG. 2A is a front view of the pushcart 10, and FIG. 2B is a plan view of the pushcart 10.

The pushcart 10 includes a main body 11 formed in a shape which is relatively long in a vertical direction (a Z direction in the drawing) and is relatively short in a depth direction (a Y direction in the drawing) as well as in a right-left direction (an X direction in the drawing). In a lower portion of the main body 11 downward in the vertical direction, a pair of main wheels 12 is respectively attached to right and left ends thereof in a travelling direction. The main wheels 12 are configured of a left wheel 12A and a right wheel 12B.

The left wheel 12A (first wheel) is provided at the left side of the main body 11 in the travelling direction (a positive direction of the Y axis). The right wheel 12B (second wheel) is provided at the right side of the main body 11 in the travelling direction. The left wheel 12A rotates about a rotational shaft (axle) of the left wheel 12A having a central axis in the right-left direction. The right wheel 12B rotates about a rotational shaft of the right wheel 12B having a central axis in the right-left direction. Note that the main wheels 12 do not rotate relative to the main body 11 when viewed in the vertical direction. To rephrase, the main wheels 12 do not change their orientations relative to the main body 11.

The main body 11, formed of two rod-like members respectively linked to the main wheels 12 and connected at the upper portion thereof, is rotatable about the shafts of the main wheels 12 in a pitch direction. However, it is not necessary for the main body 11 to be formed of two rod-like members like in this example; the main body 11 may be formed of a single rod-like member, or formed of a thin plate-like member. In the vicinity of the lower portion of the main body 11, there is disposed a box 16 storing a control board, a battery, and the like. Note that, in reality, a cover is attached to the main body 11 so that the board and the like inside the main body 11 are not seen from the exterior.

A holding section 15 is formed in a cylinder shape being long in the right-left direction, is bent near the right and left ends in a reverse direction (toward a rear side) with respect to the travelling direction, and then extends toward the rear side. With this, the position at which a user U holds the holding section 15 can be shifted toward the rear side, thereby making it possible to widen a space at the feet of the user U.

Support members 13 formed in a thin plate-like shape and extending toward the rear side are linked to the rotational shafts of the main wheels 12. The support members 13 are connected to the rotational shafts of the main wheels 12 in a rotatable manner in the pitch direction so as to extend in parallel to a road surface.

Auxiliary wheels 14 are each linked to a lower surface of the support member 13 on the opposite direction side relative to a side where the support member 13 is linked to the rotational shaft of the main wheel 12. This allows both the main wheel 12 and the auxiliary wheel 14 to make contact with the road surface. The support member 13 extends toward the rear side of the travelling direction farther than the main wheel 12. As a result, the main wheel 12 having a relatively large inside diameter is disposed on the front side in the travelling direction, which makes it easy to ride over a step. The support member 13 may be disposed in a mode in which it is extended toward the front side in the travelling direction farther than the main wheel 12 so that the auxiliary wheel 14 is disposed on the front side in the travelling direction farther than the main wheel. With the mode in which the support member 13 extends toward the front side farther than the main wheel 12, the space at the feet of the user U can be widened.

Although FIGS. 1 and 2 illustrate a state in which the auxiliary wheels 14 are in contact with the road surface, the pushcart 10 can be self-standing by performing inverted pendulum control even if only the main wheels 12 are in a state of making contact with the road surface.

Further, in this example, the support members 13 and the auxiliary wheels 14 both in the number of two are so provided as to be linked to the respective rotational shafts of the right and left main wheels 12; however, the support members 13 and the auxiliary wheels 14 may be provided in a mode in which each of the number of the support members 13 and the number of the auxiliary wheels 14 is one or more than two. Note that, by the support members and auxiliary wheels being linked to the rotational shafts of the right and left main wheels 12 as shown in FIGS. 2A and 2B, the space at the feet of the user U can be widened.

In the holding section 15, a user interface (I/F) 27 including a power switch and the like is provided. The user U can push the pushcart 10 forward in the travelling direction by holding the holding section 15. Alternatively, by placing his or her forearms or the like on the holding section 15 so as to press from above without necessarily holding the holding section 15, the user U can also push the pushcart 10 forward in the travelling direction by making use of friction generated between the holding section 15 and the forearms or the like while placing the forearms or the like on the holding section 15.

Figure 3:
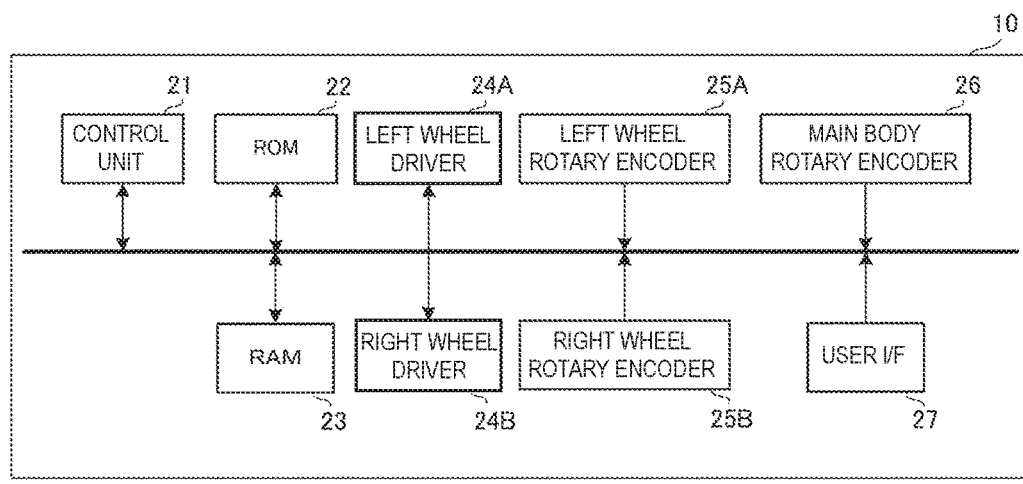
FIG. 3 is a block diagram illustrating a hardware configuration of the pushcart according to the first embodiment.

A hardware configuration and operations of the pushcart 10 will be described next. FIG. 3 is a block diagram illustrating the configuration of the pushcart 10. The pushcart 10 includes a control unit 21, a ROM 22, a RAM 23, a left wheel driver 24A, a right wheel driver 24B, a left wheel rotary encoder 25A, a right wheel rotary encoder 25B, a main body rotary encoder 26, and the user interface (I/F) 27.

The control unit 21 is a functional unit configured to integrally control the pushcart 10, and realizes various kinds of operations by reading out programs stored in the ROM 22 and executing the above programs in the RAM 23.

The left wheel driver 24A (first wheel driver) is a functional unit configured to supply power to the left wheel 12A by driving a motor for rotating the rotational shaft attached to the left wheel 12A, and drives the motor of the left wheel 12A based on an output signal of the control unit 21 so as to rotate the left wheel 12A about the rotational shaft of the left wheel 12A. The right wheel driver 24B (second wheel driver) is a functional unit configured to supply power to the right wheel 12B by driving a motor for rotating the rotational shaft attached to the right wheel 12B, and drives the motor of the right wheel 12B based on an output signal of the control unit 21 so as to rotate the right wheel 12B about the rotational shaft of the right wheel 12B.

The left wheel rotary encoder 25A detects a rotational angle of the left wheel 12A about the rotational shaft of the left wheel 12A, and outputs the detection result to the control unit 21. The right wheel rotary encoder 25B detects a rotational angle of the right wheel 12B about the rotational shaft of the right wheel 12B, and outputs the detection result to the control unit 21. The main body rotary encoder 26 detects an intersection angle which is an angle formed by the main body 11 and the support member 13, and outputs the detection result to the control unit 21. Hereinafter, the above-mentioned intersection angle is referred to as a pitch angle. The pitch angle may be detected by a potentiometer rather than only by the rotary encoder.

Figure 4:
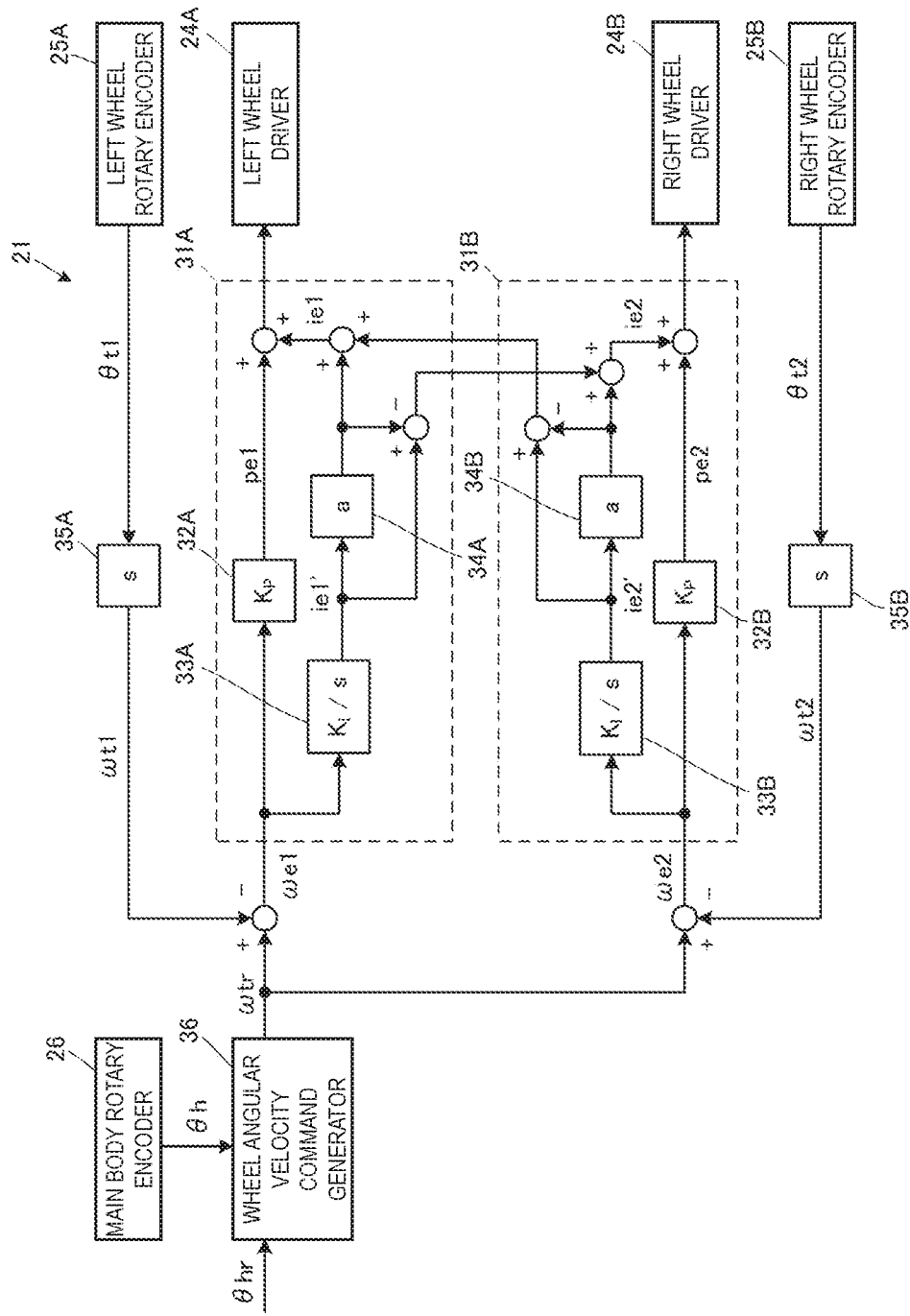
FIG. 4 is a control configuration diagram of a control unit according to the first embodiment.

FIG. 4 is a control configuration diagram of the control unit 21. The control unit 21 separately controls the left wheel driver 24A and the right wheel driver 24B. The control unit 21 performs feedback control on the angular velocities of the left wheel 12A and the right wheel 12B about the rotational shafts thereof using PI control. The control unit 21 includes a PI control section 31A, a PI control section 31B, a differential element 35A, a differential element 35B, and a wheel angular velocity command generator 36.

The wheel angular velocity command generator 36 calculates a wheel angular velocity command value $\omega tr$ based on a pitch angle $\theta h$ of the main body 11 detected by the main body rotary encoder 26 and a pitch angle command value $\theta hr$. The pitch angle command value $\theta hr$ is a target value for the pitch angle $\theta h$ of the main body 11. For example, in the case where the pushcart 10 is on a level road surface, when the main body 11 is so controlled as to be vertical to the road surface, the pitch angle command value $\theta hr$ is set to 90 degrees. The wheel angular velocity command value $\omega tr$ is a target value for the angular velocity of the main wheel 12 about the rotational shaft of the main wheel 12, and is determined so that the pitch angle $\theta h$ will come to be the pitch angle command value $\theta hr$. In the pushcart 10, the target value for the angular velocity of the left wheel 12A about the rotational shaft thereof and the target value for the angular velocity of the right wheel 12B about the rotational shaft thereof are equal to each other. The wheel angular velocity command value $\omega tr$ is calculated, for example, by using a formula $\omega tr = K_A(\theta hr - \theta h)$, where $K_A$ is a proportional gain.

The differential element 35A differentiates a rotational angle $\theta t1$ of the left wheel 12A detected by the left wheel rotary encoder 25A to calculate an angular velocity $\omega t1$ of the left wheel 12A about the rotational shaft of the left wheel 12A. The differential element 35B differentiates a rotational angle $\theta t2$ of the right wheel 12B detected by the right wheel rotary encoder 25B to calculate an angular velocity $\omega t2$ of the right wheel 12B about the rotational shaft of the right wheel 12B. The left wheel rotary encoder 25A and the differential element 35A, and the right wheel rotary encoder 25B and the differential element 35B correspond to a wheel angular velocity detector of the present disclosure.

The PI control section 31A performs PI control taking an angular velocity deviation value $\omega e1 = \omega tr - \omega t1$ as a control deviation. The PI control section 31B performs PI control taking an angular velocity deviation value $\omega e2 = \omega tr - \omega t2$ as a control deviation. The left wheel driver 24A applies torque to the left wheel 12A in accordance with the output of the PI control section 31A. The right wheel driver 24B applies torque to the right wheel 12B in accordance with the output of the PI control section 31B.

The PI control section 31A includes a proportional operation portion 32A, an integral operation portion 33A, and a coefficient processing portion 34A. The PI control section 31B includes a proportional operation portion 32B, an integral operation portion 33B, and a coefficient processing portion 34B. The proportional operation portion 32A calculates a proportional term $pe1 = K_p \omega e1$ taking the angular velocity deviation value $\omega e1$ as a control deviation. The proportional operation portion 32B calculates a proportional term $pe2 = K_p \omega e2$ taking the angular velocity deviation value $\omega e2$ as a control deviation. Here, $K_p$ is a proportional gain. The integral operation portion 33A calculates an integral term $ie1'$ by multiplying a time integral of the angular velocity deviation value $\omega e1$ by an integral gain $K_I$. The integral operation portion 33B calculates an integral term $ie2'$ by multiplying a time integral of the angular velocity deviation value $\omega e2$ by the integral gain $K_I$.

The coefficient processing portion 34A calculates $a \cdot ie1'$ taking the integral term $ie1'$ as input. The coefficient processing portion 34B calculates $a \cdot ie2'$ taking the integral term $ie2'$ as input. A coefficient "a" represents, as explained later, a level of averaging of an integral term $ie1$ and an integral term $ie2$. To rephrase, the coefficient a represents a level of sharing of the integral operation portion 33A and the integral operation portion 33B. The coefficient a is set within a range of $0.5 \leq a \leq 1.0$. In the first embodiment, the coefficient a is set to 0.5.

The PI control section 31A calculates the integral term $ie1$ by obtaining an arithmetic average of the integral term $ie1'$ and the integral term $ie2'$. The PI control section 31B calculates the integral term $ie2$ by obtaining an arithmetic average of the integral term $ie1'$ and the integral term $ie2'$. The integral term $ie1$ and the integral term $ie2$ are expressed in a time region by the following formula.

[Formula]

$$ie1(t) = ie2(t) = 0.5 \cdot K_I \int \omega e1(t)dt + 0.5 \cdot K_I \int \omega e2(t)dt \quad (1)$$

The first term of Formula (1) corresponds the integral term $ie1'$, and the second term of Formula (1) corresponds to the integral term $ie2'$. The integral term $ie1'$ corresponds to an "integral element with respect to an angular velocity of a first wheel about a rotational shaft thereof" of the present disclosure. The integral term $ie2'$ corresponds to an "integral element with respect to an angular velocity of a second wheel about a rotational shaft thereof" of the present disclosure. The integral term $ie1$ and the integral term $ie2$ correspond to a "weighted average" of the present disclosure. The PI control section 31A outputs a sum of the proportional term $pe1$ and the integral term $ie1$. The PI control section 31B outputs a sum of the proportional term pe2 and the integral term ie2.

As discussed above, the pushcart 10 performs inverted pendulum control and controls its posture so that the pitch angle θh of the main body 11 is maintained at the pitch angle command value θhr. Further, in the case where tilting the main body 11 is continued so that a difference between the pitch angle θh and the pitch angle command value θhr becomes a value of not zero, the pushcart 10 keeps rotating the main wheels 12 about the rotational shafts thereof so as to maintain the pitch angle θh at the pitch angle command value θhr. With this, the pushcart 10 moves forward or backward.

Figure 5A:
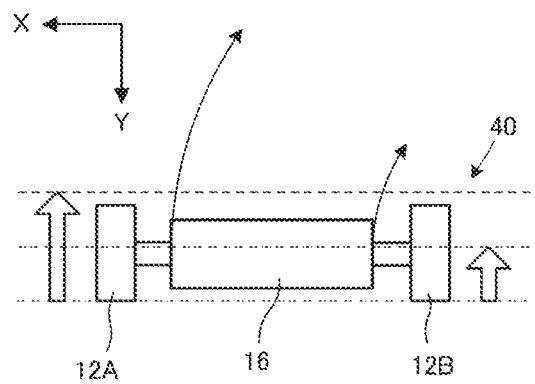
FIG. 5A is a schematic plan view illustrating operations of a pushcart in an existing configuration.
Figure 5B:
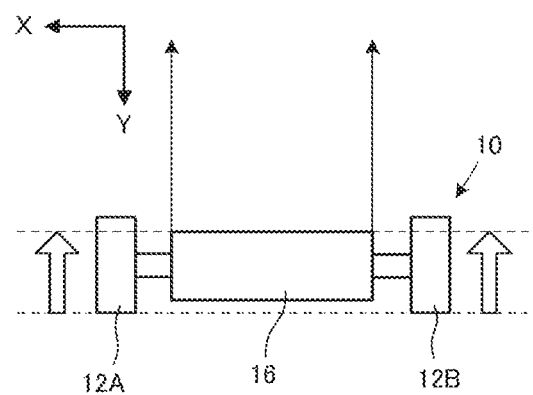
FIG. 5B is a schematic plan view illustrating operations of the pushcart according to the first embodiment.

FIG. 5A is a schematic plan view illustrating operations of a pushcart 40 in an existing configuration. FIG. 5B is a schematic plan view illustrating operations of the pushcart 10. Arrows extending toward the front side of each pushcart indicate a travelling direction of the pushcart in the case where only the left wheel 12A fell into a groove when a user attempted to move the pushcart straight in the travelling direction, and thereafter the left wheel 12A has come out of the groove. A length of the arrow on the left wheel 12A side represents magnitude of the integral term ie1, while a length of the arrow on the right wheel 12B side represents magnitude of the integral term ie2. Note that in FIGS. 5A and 5B, part of the configuration of the pushcart is omitted.

The pushcart 40 is configured in the same manner as the pushcart 10 except that the PI control section 31A and the PI control section 31B are independent of each other, in other words, the coefficient a is set to 1. In the case where the left wheel 12A falls into a groove and a large load is exerted on the left wheel 12A, the angular velocity ωt1 of the left wheel 12A becomes slow so that an absolute value of the angular velocity deviation value ωe1 becomes large. Then, the angular velocity deviation value ωe1 of this time is accumulated in the integral term ie1. With this, even when the left wheel 12A has come out of the groove and started its normal rotation about the rotational shaft thereof, the integral term ie1 maintains a large value. Meanwhile, because a normal load is exerted on the right wheel 12B and the PI control sections 31A, 31B are independent of each other, the integral term ie2 maintains the normal value. This makes the toque applied to the left wheel 12A larger than the torque applied to the right wheel 12B. As a result, the pushcart 40 turns right (revolves clockwise in the yaw direction) against the intention of the user. Because the angular velocity command value ωtr is common to the left wheel 12A and the right wheel 12B, the proportional terms pe1 and pe2 work so as to suppress the turn of the pushcart 40. However, at the time when the pushcart 40 starts the turn, the integral terms more contribute to the turn of the pushcart 40 than the proportional terms.

In the case of the pushcart 10, as expressed by Formula (1), the integral term ie1 equals the integral term ie2 regardless of the angular velocity deviation value ωe1 or the angular velocity deviation value ωe2. Further, as discussed above, the proportional term pe1 and the proportional term pe2 work so as to suppress the turn of the pushcart 10. As such, the pushcart 10 travels in a straight line as intended by the user after the left wheel 12A has come out of the groove. When the pushcart 10 travels in a straight line and the angular velocity ωt1 and the angular velocity ωt2 become equal to each other, the integral term ie1 and the integral term ie2 become the same in terms of numerical values as in the case where the PI control section 31A and the PI control section 31B are independent of each other. With this, the angular velocity ωt1 and the angular velocity ωt2 are so controlled as to be the angular velocity command value ωtr.

In the first embodiment, as expressed by Formula (1), the integral term ie1 and the integral term ie2 are equal to each other. That is to say, even if the loads exerted on the left wheel 12A and the right wheel 12B significantly differ from each other temporarily, the integral terms are averaged so that the deviation in the integral terms is dispersed. With this, even in the case where the loads exerted on the left wheel 12A and right wheel 12B significantly differ from each other and thereafter they become substantially equal to each other, the pushcart 10 can be controlled to travel in a straight line as intended by the user. In other words, the pushcart 10 can travel in a straight line as intended by the user even when the pushcart 10 has returned to a state of normal travelling from a state in which different loads were exerted on the left wheel 12A and the right wheel 12B.

Second Embodiment

Figure 6:
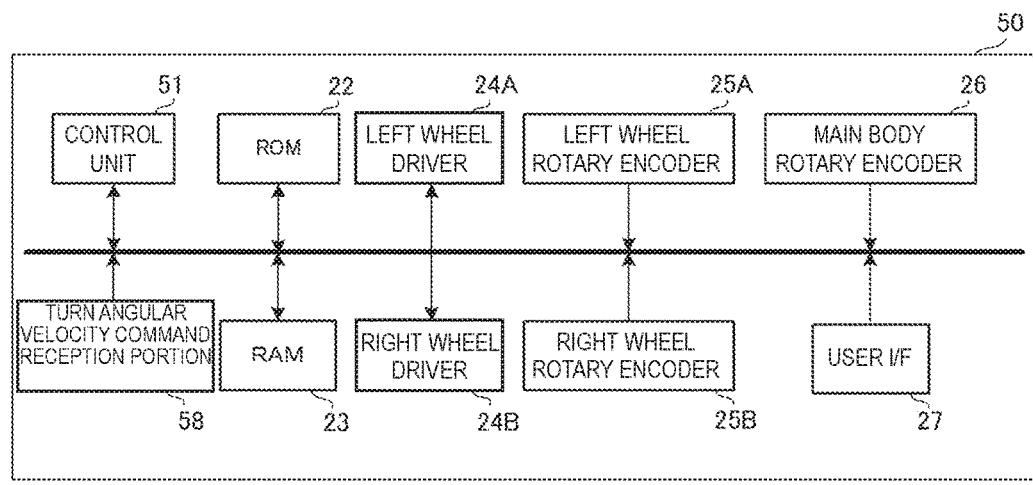
FIG. 6 is a block diagram illustrating a configuration of a pushcart according to a second embodiment.

A pushcart 50 according to a second embodiment of the present disclosure will be described. FIG. 6 is a block diagram illustrating a configuration of the pushcart 50. The pushcart 50 includes a control unit 51 in place of the control unit 21 of the first embodiment, and includes, in addition to the configuration of the first embodiment, a turn angular velocity command reception portion 58. The turn angular velocity command reception portion 58 receives an operation to turn the pushcart 50 carried out by a user, and outputs a turn angular velocity command value ωc. The turn angular velocity command value ωc is a target value for an angular velocity of the pushcart 50 in the yaw direction.

Figure 7:
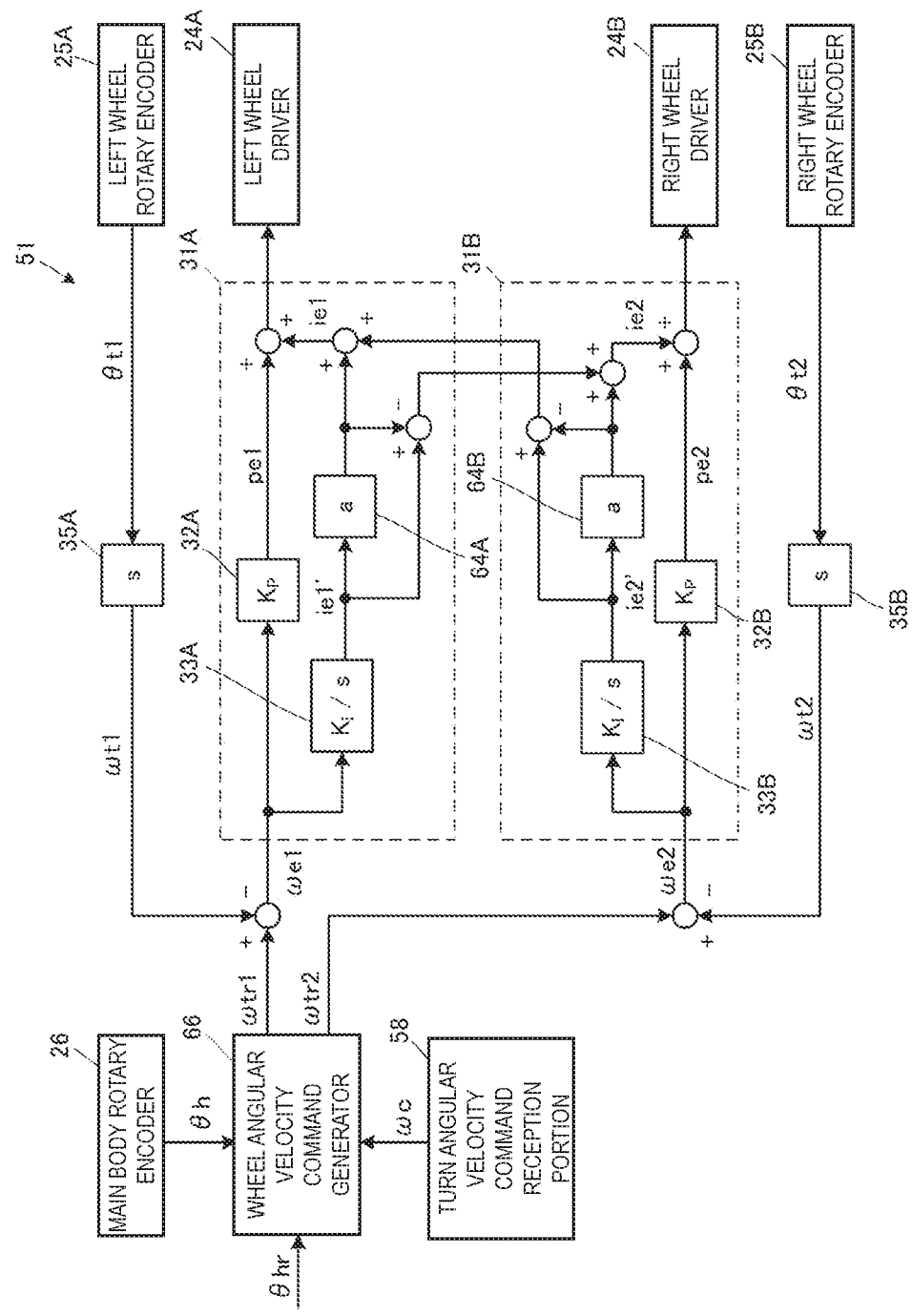
FIG. 7 is a control configuration diagram of a control unit according to the second embodiment.
Figure 8:
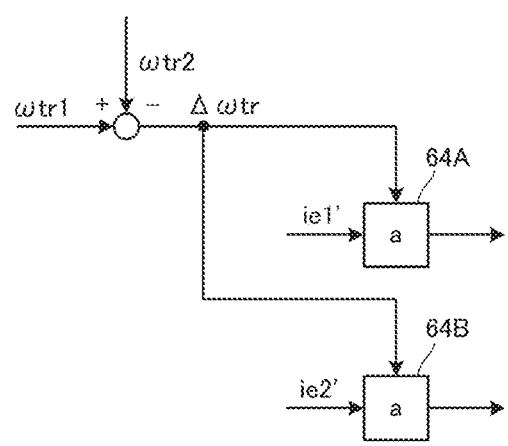
FIG. 8 is another control configuration diagram of the control unit according to the second embodiment.

FIGS. 7 and 8 are control configuration diagrams of the control unit 51. The control unit 51 includes a PI control section 61A, a PI control section 61B, and a wheel angular velocity command generator 66 in place of the PI control section 31A, the PI control section 31B, and the wheel angular velocity command generator 36 of the first embodiment. The wheel angular velocity command generator 66 calculates a wheel angular velocity command value ωtr1 and a wheel angular velocity command value ωtr2 based on the pitch angle θh of the main body 11, the pitch angle command value θhr, and the turn angular velocity command value ωc. The wheel angular velocity command value ωtr1 is a target value for the angular velocity of the left wheel 12A about the rotational shaft thereof. The wheel angular velocity command value ωtr2 is a target value for the angular velocity of the right wheel 12B about the rotational shaft thereof. The wheel angular velocity command value ωtr1 and the wheel angular velocity command value ωtr2 are so determined as to realize the pitch angle command value θhr and the turn angular velocity command value ωc.

The PI control section 61A performs PI control taking an angular velocity deviation value ωe1=ωtr1−ωt1 as a control deviation. The PI control section 61B performs PI control taking an angular velocity deviation value ωe2=ωtr2−ωt2 as a control deviation. The PI control section 61A includes a coefficient processing portion 64A in place of the coefficient processing portion 34A of the first embodiment. The PI control section 61B includes a coefficient processing portion 64B in place of the coefficient processing portion 34B of the first embodiment.

A coefficient "a" of the coefficient processing portion 64A and the coefficient processing portion 64B is set, as shown in FIG. 8, based on a difference Δωtr=|ωtr1−ωtr2|, which is a difference between the wheel angular velocity command value ωtr1 and the wheel angular velocity command value ωtr2. The coefficient a becomes larger in a step-like pattern as the difference Δωtr becomes larger, for example. Then, in the case where the difference Δωtr is smaller than a threshold, that is, in the case where the user attempts to move the pushcart 50 in a straight line, the coefficient a becomes 0.5. In the case where the difference Δωtr is larger than the threshold, that is, in the case where the user attempts to turn the pushcart 50, the coefficient a becomes 1.0. The coefficient a may change linearly with respect to the difference Δωtr.

The coefficient processing portion 64A calculates a·ie1' taking the integral term ie1' as input. The coefficient processing portion 64B calculates a·ie2' taking the integral term ie2' as input. Here, input-output of the coefficient processing portion 64A and input-output of the coefficient processing portion 64B are expressed in a time region.

The PI control section 61A calculates the integral term ie1 by obtaining a weighted average of the integral term ie1' and the integral term ie2'. The PI control section 61B calculates the integral term ie2 by obtaining a weighted average of the integral term ie1' and the integral term ie2'. The integral term ie1 and the integral term ie2 are expressed in a time region by the following formulas.

[Formulas]

$$ie1(t)=a(t)\cdot K_I \int \omega e1(t)dt+(1-a(t))\cdot K_I \int \omega e2(t)dt \quad (2)$$

$$ie2(t)=a(t)\cdot K_I \int \omega e2(t)dt+(1-a(t))\cdot K_I \int \omega e1(t)dt \quad (3)$$

The first term of Formula (2) and the second term of Formula (3) correspond to the integral term ie1', while the second term of Formula (2) and the first term of Formula (3) correspond to the integral term ie2'. The coefficient a is a weight in the calculation of the weighted average. As discussed above, as the difference Δωtr becomes smaller, the coefficient a approaches 0.5. Accordingly, as the difference Δωtr becomes smaller, the weighted average approaches the arithmetic average.

When the coefficient a is 0.5, the integral term ie1 becomes equal to the integral term ie2. When the coefficient a is 1.0, the integral term ie1 becomes equal to the integral term ie1' and the integral term ie2 becomes equal to the integral term ie2'. In other words, the PI control section 61A becomes independent of the PI control section 61B. In the manner as discussed above, by adjusting the value of the coefficient a, a level of averaging of the integral terms can be controlled, to rephrase, a level of dispersion of the deviation in the integral terms can be controlled.

In the second embodiment, in the case where a user attempts to make the pushcart 50 travel straight in the travelling direction, the coefficient a becomes 0.5 and the integral term ie1 becomes equal to the integral term ie2. Because of this, the user can move the pushcart 50 in a straight line even after the loads exerted on the left wheel 12A and the right wheel 12B have become significantly different from each other temporarily. In the case where the user attempts to turn the pushcart 50, the coefficient a becomes 1.0 and the PI control section 61A and PI control section 61B become independent of each other. With this, the angular velocity ωt1 and the angular velocity ωt2 are so controlled as to become the wheel angular velocity command value ωtr1 and the wheel angular velocity command value ωtr2, respectively. This makes it possible for the user to turn the pushcart 50.

Third Embodiment

Figure 9:
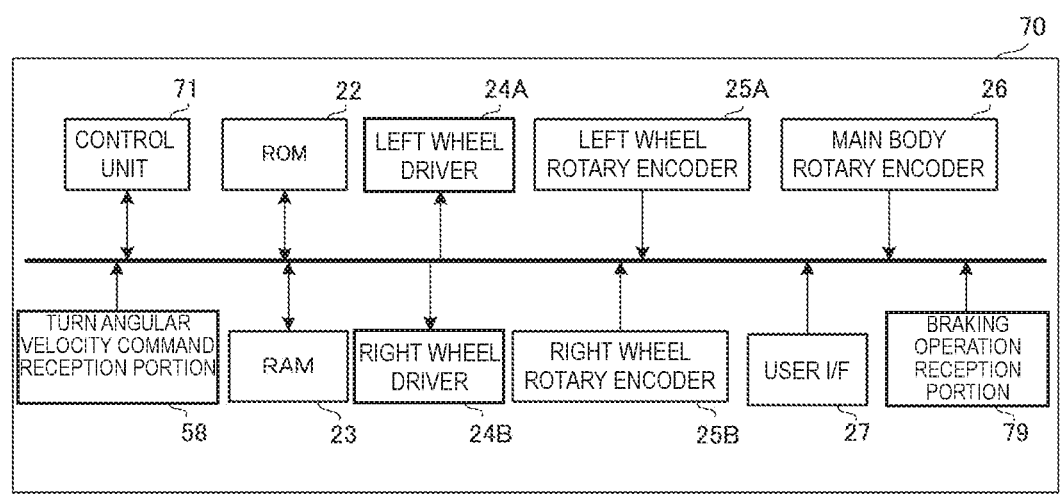
FIG. 9 is a block diagram illustrating a configuration of a pushcart according to a third embodiment.

A pushcart 70 according to a third embodiment of the present disclosure will be described. FIG. 9 is a block diagram illustrating a configuration of the pushcart 70. The pushcart 70 includes a control unit 71 in place of the control unit 51 of the second embodiment, and includes a braking operation reception portion 79 in addition to the configuration of the second embodiment. The braking operation reception portion 79 is provided, for example, on the holding section 15. The braking operation reception portion 79 receives a braking operation with respect to the main wheels 12, and outputs a braking operation amount "b". The braking operation amount corresponds to an "operation amount of a braking operation" of the present disclosure.

Figure 10:
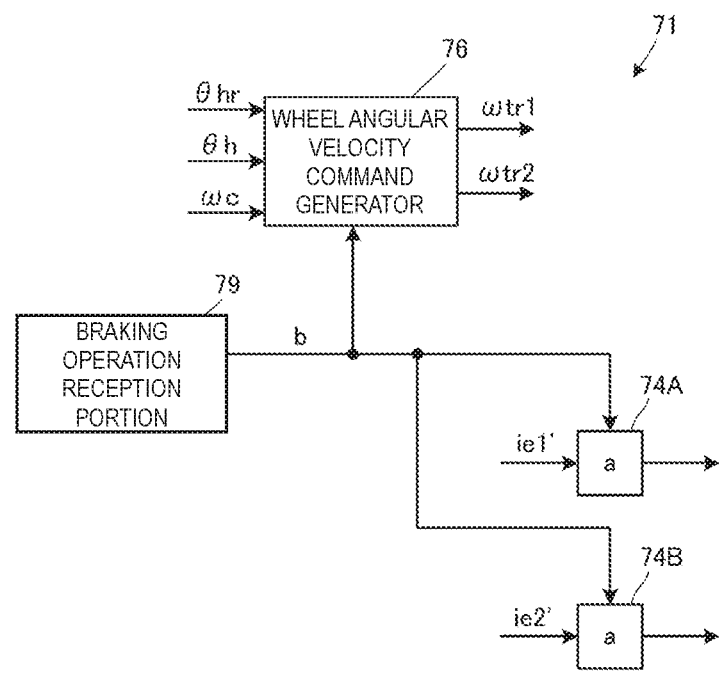
FIG. 10 is a control configuration diagram illustrating part of a control unit according to the third embodiment.

FIG. 10 is a control configuration diagram illustrating part of the control unit 71. The control unit 71 includes a wheel angular velocity command generator 76, a coefficient processing portion 74A, and a coefficient processing portion 74B in place of the wheel angular velocity command generator 66, the coefficient processing portion 64A, and the coefficient processing portion 64B of the second embodiment.

The wheel angular velocity command generator 76 calculates a wheel angular velocity command value ωtr1 and a wheel angular velocity command value ωtr2 based on the pitch angle θh of the main body 11, the pitch angle command value θhr, the turn angular velocity command value ωc, and the braking operation amount b. The wheel angular velocity command value ωtr1 and the wheel angular velocity command value ωtr2 approach 0 as the braking operation amount b becomes larger, and become 0 when the braking operation amount b is at its maximum, that is, the stated command values become 0 when the user attempts to stop the pushcart 70.

The coefficient a of the coefficient processing portion 74A and the coefficient processing portion 74B is set based on the braking operation amount b. For example, the coefficient a approaches 0.5 as the braking operation amount b becomes larger, and becomes 0.5 when the braking operation amount b is at its maximum. In other words, as expressed by Formulas (2) and (3), the weighted average approaches the arithmetic average as the braking operation amount b becomes larger.

In the third embodiment, in the case where a user attempts to stop the pushcart 70, the coefficient a becomes 0.5 and the integral term ie1 becomes equal to the integral term ie2. With this, the user can stop the pushcart 70 without necessarily the pushcart 70 being revolved in the yaw direction even if the integral term ie1 and the integral term ie2 significantly differ from each other before the braking operation. Note that, because the integral terms are averaged, the pushcart 70 slightly moves forward or backward in some case when being stopped. However, the user can freely change the pitch angle θh of the main body 11, whereby the user can operate the pushcart 70 so that the pushcart 70 does not move forward or backward without necessarily having a clear consciousness.

Fourth Embodiment

Figure 11:
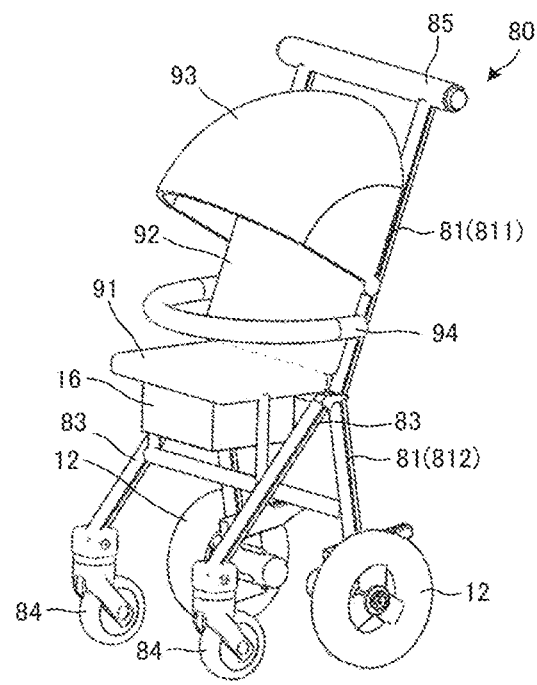
FIG. 11 is an exterior appearance perspective view of a baby carriage according to a fourth embodiment.
Figure 12:
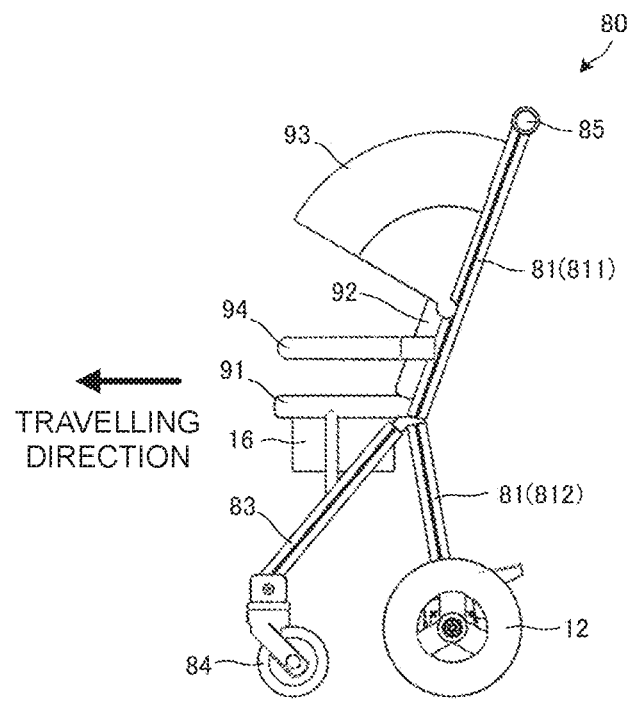
FIG. 12 is a left side view of the baby carriage according to the fourth embodiment.
Figure 13:
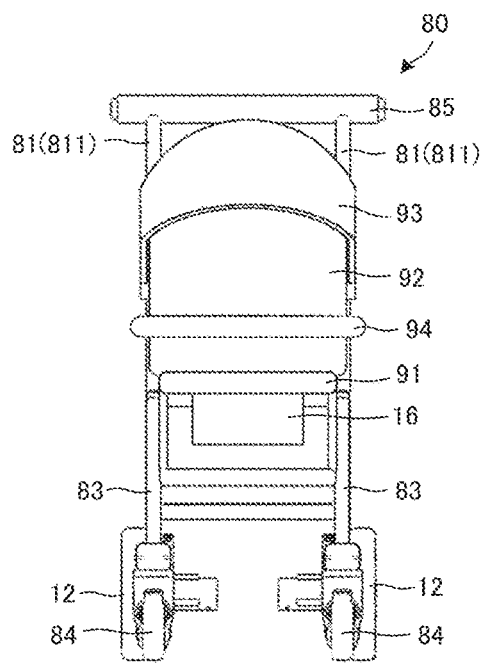
FIG. 13 is a front view of the baby carriage according to the fourth embodiment.
Figure 14:
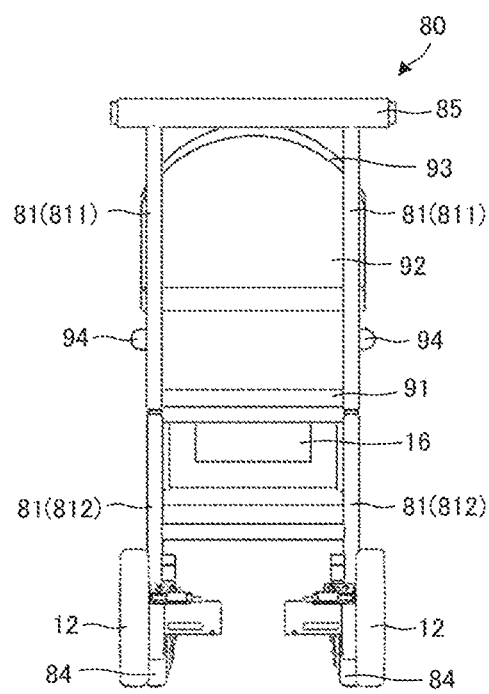
FIG. 14 is a rear view of the baby carriage according to the fourth embodiment.

A baby carriage according to a fourth embodiment of the present disclosure will be described. The stated baby carriage is an example of a pushcart of the present disclosure. FIG. 11 is an exterior appearance perspective view of a baby carriage 80. FIG. 12 is a left side view of the baby carriage 80. FIG. 13 is a front view of the baby carriage 80. FIG. 14 is a rear view of the baby carriage 80. The baby carriage 80 includes a main body 81. The main body 81 is a frame-like member extending substantially in the vertical direction.

A pair of main wheels 12 is supported in a rotatable manner at an end portion on the lower side of the main body 81. An auxiliary support member 83 is provided substantially at the center of the main body 81 so as to stick out toward the travelling direction side of the baby carriage 80, and a pair of auxiliary wheels 84 is supported in a rotatable manner at an end portion of the auxiliary support member 83. As such, in the baby carriage 80, the pair of main wheels 12 are rear wheels and the pair of auxiliary wheels 84 are front wheels. A diameter of each main wheel 12 is longer than a diameter of the auxiliary wheel 84.

An upper portion 811 of the main body 81 is slightly slanted toward the opposite side of the travelling direction of the baby carriage 80, and a cylinder-shaped holding section 85 is provided at an end portion on the upper side of the main body 81. In the holding section 85, there are provided a user interface including a power switch and the like, and a holding force detector (either of them not shown). The holding force detector detects a force of a user (a person who pushes the baby carriage) holding the holding section 85 (holding force). The holding force detector is, for example, a contact sensor including a piezoelectric device or the like configured to detect a pressure force against the holding section 85.

A seat 91 where a baby is seated is provided substantially at the center of the main body 81. A backrest 92, a sun shade 93, and a front bar 94 are provided between a pair of frames of the upper portion 811 of the main body 81. The backrest 92 is arranged along the frame of the upper portion 811 of the main body 81. The sun shade 93 is so arranged as to cover an upper portion of the backrest 92. The front bar 94 is formed in a substantially U shape, and both ends of the front bar 94 are attached to the frame of the upper portion 811 of the main body 81. A box 16 is provided under the seat 91. Inside the box 16, there are stored a battery for supplying drive voltages to respective portions of the baby carriage 80, a control board, and the like.

A hardware configuration and operations of the baby carriage 80 are the same as the hardware configuration and the operations of the pushcart 10 of the first embodiment (see FIGS. 3 and 4). Note that, however, the baby carriage 80 includes the holding force detector in place of the main body rotary encoder 26 of the pushcart 10. The wheel angular velocity command generator of the baby carriage 80 calculates a wheel angular velocity command value ωtr based on the holding force detected by the holding force detector.

The baby carriage 80 may be configured as follows. That is, the frame of the upper portion 811 of the main body 81 is attached to a frame of a lower portion 812 of the main body 81 in a rotatable manner in the pitch direction. The baby carriage 80 includes a main body rotary encoder for detecting an angle (pitch angle) formed by the frame of the upper portion 811 of the main body 81 and the frame of the lower portion 812 of the main body 81. The wheel angular velocity command generator of the baby carriage 80 calculates a wheel angular velocity command value ωtr based on the pitch angle θh of the main body 81 detected by the main body rotary encoder and the pitch angle command value θhr, like in the pushcart 10 of the first embodiment.

Like the pushcart 50 of the second embodiment, the baby carriage 80 may operate in response to a turning operation by the user. Further, like the pushcart 70 of the third embodiment, the baby carriage 80 may operate in response to a braking operation by the user.

Although, in the above-described embodiments, the left wheel driver 24A and the right wheel driver 24B are controlled through PI control, the disclosure is not limited thereto. In the present disclosure, the left wheel driver 24A and the right wheel driver 24B may be controlled through PID control.

Further, although, in the above embodiments, the weighted averaging is carried out at the output side of the integral operation portion 33A and the integral operation portion 33B, the disclosure is not limited thereto. In the present disclosure, the weighted averaging may be carried out at the input side of the integral operation portions in the case where the coefficient a is set to a constant value.

REFERENCE SIGNS LIST

U USER
10, 40, 50, 70 PUSHCART
11, 81 MAIN BODY
12 MAIN WHEEL
12A LEFT WHEEL (FIRST WHEEL)
12B RIGHT WHEEL (SECOND WHEEL)
13 SUPPORT MEMBER
14, 84 AUXILIARY WHEEL
15, 85 HOLDING SECTION
16 BOX
21, 51, 71 CONTROL UNIT
22 ROM
23 RAM
24A LEFT WHEEL DRIVER (FIRST WHEEL DRIVER)
24B RIGHT WHEEL DRIVER (SECOND WHEEL DRIVER)
25A LEFT WHEEL ROTARY ENCODER
25B RIGHT WHEEL ROTARY ENCODER
26 MAIN BODY ROTARY ENCODER
27 USER I/F
31A, 61A PI CONTROL SECTION
31B, 61B PI CONTROL SECTION
32A PROPORTIONAL OPERATION PORTION
32B PROPORTIONAL OPERATION PORTION
33A INTEGRAL OPERATION PORTION
33B INTEGRAL OPERATION PORTION
34A, 64A, 74A COEFFICIENT PROCESSING PORTION
34B, 64B, 74B COEFFICIENT PROCESSING PORTION
35A DIFFERENTIAL ELEMENT
35B DIFFERENTIAL ELEMENT
36, 66, 76 WHEEL ANGULAR VELOCITY COMMAND GENERATOR
58 TURN ANGULAR VELOCITY COMMAND RECEPTION PORTION
79 BRAKING OPERATION RECEPTION PORTION
80 BABY CARRIAGE
83 AUXILIARY SUPPORT MEMBER
91 SEAT
92 BACKREST
93 SUN SHADE
94 FRONT BAR

The invention claimed is:

1. A pushcart comprising:
a main body;
a first wheel provided at a left side of the main body;
a second wheel provided at a right side of the main body;
a first wheel driver that rotates the first wheel about a rotational shaft of the first wheel;
a second wheel driver that rotates the second wheel about a rotational shaft of the second wheel;

a controller that separately controls the first wheel driver and the second wheel driver; and a wheel angular velocity detector that detects an angular velocity of each of the first wheel and the second wheel about the respective rotational shafts, wherein the controller performs a feedback control using at least an integral operation on the angular velocities of the first wheel and the second wheel about the rotational shafts thereof, wherein the controller calculates a weighted average of an integral element with respect to the angular velocity of the first wheel about the rotational shaft of the first wheel and an integral element with respect to the angular velocity of the second wheel about the rotational shaft of the second wheel, and wherein the controller separately controls the first wheel driver and the second wheel driver based on the weighted average.

2. The pushcart according to claim 1, wherein the controller makes the weighted average approach an arithmetic average as a difference between an angular velocity command value of the first wheel and an angular velocity command value of the second wheel decreases.

3. The pushcart according to claim 1, further comprising:

a braking operation reception portion that receives a braking operation from a user with respect to the first wheel and the second wheel, wherein the controller makes the weighted average approach an arithmetic average as the braking operation increases.

4. The pushcart according to claim 1, further comprising:

a turn angular velocity command reception portion that receives an operation to turn the pushcart from a user, and outputs a turn angular velocity command value, wherein the controller separately controls the first wheel driver and the second wheel driver based on the angular velocity command value.

5. The pushcart according to claim 1, further comprising:

a main body rotary encoder that detects a pitch angle of the pushcart, wherein the controller separately controls the first wheel driver and the second wheel driver based on the pitch angle.

6. The pushcart according to claim 1, wherein the integral elements correspond to:

$$0.5 \cdot K_I \int \omega e1(t)dt + 0.5 \cdot K_I \int \omega e2(t)dt$$

wherein $K_I$ is an integral gain, and $\omega e1$ and $\omega e2$ are angular velocity deviation values of the left and right wheels, respectively.

7. The pushcart according to claim 1, wherein the integral elements correspond to:

$$a(t) \cdot K_I \int \omega e1(t)dt + (1-\alpha(t)) \cdot K_I \int \omega e2(t)dt$$

wherein a(t) is a weight of in the weighted average calculation, $K_I$ is an integral gain, $\omega e1$ is an angular velocity deviation value of the wheel corresponding to the integral element, and $\omega e2$ is an angular velocity deviation value of the other wheel.

* * * * *